United States Patent Office 3,541,080
Patented Nov. 17, 1970

3,541,080
PROCESS FOR PREPARING LACTAM HYDRO-CHLORIDE AND A FREE BASE THEREOF
Shigeru Wakamatsu, Ryozo Kondo, Masayasu Shinomiya, and Masaru Okamoto, Nagoya, Japan, assignors to Toyo Rayon Kabushiki Kaisha, Tokyo, Japan, a corporation of Japan
No Drawing. Filed July 24, 1967, Ser. No. 655,349
Claims priority, application Japan, July 28, 1966, 41/49,027
Int. Cl. C07d *41/06*
U.S. Cl. 260—239.3    8 Claims

ABSTRACT OF THE DISCLOSURE

Process using hydrogen chloride instead of sulfuric acid, not limited by the conventional process, overcoming the shortcomings thereof, capable of preparing a lactam whose purity is especially suitable as a polymerization material constantly (reappearability of the same reaction result) at an excellent yield. This improved process is achieved by combined conditions of Beckmann rearrangement of cycloalkanone oxime or its hydrochloride in the co-presence of an aliphatic carboxylic acid, especially preferably acetic acid as a solvent and a specific cyano compound at a temperature of 50–130° C.

---

The present invention relates to an improved process for preparing corresponding lactam hydrochloride by Beckmann rearrangement of cycloalkanone oxime or its hydrochloride with hydrogen chloride. The obtained lactam hydrochloride can be easily converted to a free lactam by known means.

More particularly, the present invention relates to a process using hydrogen chloride instead of sulfuric acid, not limited by the conventional process, overcoming the shortcomings thereof, capable of preparing a lactam whose purity is especially suitable as a polymerization material constantly (reappearability of the same reaction result) at an excellent yield.

This improved process is achieved by combined conditions of Beckmann rearrangement of cycloalkanone oxime or its hydrochloride in the co-presence of an aliphatic carboxylic acid, especially preferably acetic acid as a solvent and a specific cyano compound at a temperature of 50–130° C.

A reaction of cycloalkanone oximes with sulfuric acid to prepare the corresponding lactams is well known as so-called Beckmann rearrangement.

In this reaction using sulfuric acid, yield of a lactam is good, however, there is a problem in respect of a quality of the product and in order to obtain a lactam whose quality is suitable for polymerization, it is necessary to carry out careful purification.

As a proposal avoiding use of sulfuric acid, an attempt was made to react cycloalkanone oxime dissolved in an organic solvent with hydrogen chloride. However, owing to resin formation, this attempt has failed to yield caprolactam.

In Indian Patent No. 93,676 (published May 8, 1964), it was made public that by using oxime hydrochloride instead of said oxime, reaction with hydrogen chloride is carried out conveniently to obtain the corresponding lactam hydrochloride, which can be decomposed to its free base. In said patent, the reaction can be carried out in the optional presence of a solvent, as a solvent a non-aqueous solvent dissolving both the material oxime hydrochloride and the produced lactam hydrochloride is used, and as a suitable solvent nitro compounds, halogenated hydrocarbon and nitriles such as acetonitrile, benzonitrile and adiponitrile are recommended.

In South African Patent 651,924 (published April 12, 1965), a process wherein upon preparing from cyclododecanone oxime the corresponding lactam, ω-laurinolactam, similarly hydrochloride of said oxime is used and similarly hydrogen chloride is reacted in the presence of a polar organic solvent is described, the organic solvents exactly same as the aforementioned suitable solvents are proposed and it is described that nitriles are preferable because the reaction period is shortened.

On the other hand, prior to these proposals wherein hydrogen chloride is utilized without using sulfuric acid, in British Patent 563,783 (published Aug. 30, 1944), it was proposed that in order to carry out the reaction smoothly at a lower temperature while overcoming the limitation of reaction temperature control within a narrow temperature range in the case of Beckmann rearrangement with sulfuric acid, it is recommendable to use sulfuric acid diluted with acetic acid instead of an ordinarily used 80–85% aqueous sulfuric acid.

The present inventors were interested in that in case use of sulfuric acid is avoided and hydrogen chloride is utilized as in proposals of said Indian Patent 93,676 and South African Patent 651,924, only when as a material oxime, an oxime is used in the form of its hydrochloride by-production of resinous materials in substantial amounts is avoided, and started researches about an improvement whereby by-production of resinous materials would be avoided even when an oxime is not used in the form of its hydrochloride.

As a result, the present inventors have found a completely unexpected fact that in a substantially nonaqueous system wherein hydrogen chloride and an aliphatic carboxylic acid, especially preferably acetic acid, and a certain specific kind of cyano compound coexist and sulfuric acid does not exist, limitation to said material oxime is eliminated, from an oxime per se the corresponding lactam hydrochloride is advantageously produced and formation of resinous materials by-production of which had been regarded as indispensable can be avoided.

Heretofore, it has often taken place that physical properties of polymers obtained by polymerizing lactams of high purity of the same degree are not constant. The reason therefor is unclear, however, when reaction is carried out under said combined conditions reappearability of physical properties of polymers obtained by polymerizing the obtained lactam under the same conditions are excellent and lactams of the constant quality is obtained, in which respect the process of the present invention is industrially remarkably advantageous. The present inventors suppose that one of the reasons therefor is that production of a thermally decomposed substance of oxime hydrochloride which may be by-produced during the Beckmann rearrangement and the conversion of the obtained lactam hydrochloride to a free lactam is avoided together with prevention of production of resinous materials in said system.

Accordingly, an object of the present invention is to provide an improved process for preparing lactam or hydrochloride useful for preparing constantly a polymer having an excellent quality as a polymerization material overcoming limitation to the material and shortcomings upon preparing corresponding lactam hydrochloride by Beckmann rearrangement of cycloalkanone oxime or its hydrochloride with hydrogen chloride in a solvent, completely overcoming formation of inconvenient resinous materials which has been unavailable when hydrogen chloride was used and preventing production of other impurities.

Many other objects and advantages of the present invention will become clearer from the following description.

In the process of the present invention, the material oxime may be in the form of cycloalkanone oxime hydrochloride or cycloalkanone oxime per se. Heretofore, in a system wherein hydrogen chloride is used instead of sulfuric acid, due to formation of resinous materials, it has been held practically impossible to obtain a lactam and the material has had to be used in the form of oxime hydrochloride, however, in the process of the present invention such limitation is completely overcome.

Controls will be shown later, however, if the combined conditions held as indispensable in the process of the present invention are not met, formation of resinous materials and poor reappearability of the quality of a polymer prepared from the obtained lactam cannot be overcome.

The material cycloalkanone oxime is represented by the following general formula:

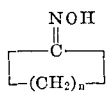

when $n$ is preferably a positive integer of 4–12. As such oxime, for instance, cyclopentanone oxime, cyclohexanone oxime, cyclo-octanone oxime and cyclododecanone oxime may be cited. Hydrochloride of such oximes as mentioned above may be similarly utilized. The reaction is carried out using hydrogen chloride in a system wherein a catalytic compound containing cyano group as will be mentioned in detail later and an aliphatic carboxylic acid solvent, especially advantageously acetic acid solvent exist.

At this time, when as material oxime hydrochloride is used, even if hydrogen chloride is not particularly supplied to the reaction system, it is possible to react hydrogen chloride derived from said hydrochloride with the material. However, it goes without saying that in this case also, addition hydrogen chloride may be supplied separately and it is preferable.

It is recommendable to carry out the reaction using hydrogen chloride in an amount of 1.0–4 mols, preferably 1.5–3 mols based on 1 mol of cycloalkanone oxime (in case of its hydrochloride, converted to oxime). It goes without saying that if desired use of a less or more amount is possible, however, as the amount becomes smaller than 1.0 mol, the reaction rate is apt to become small, while on the other hand, use of an amount above 4 mols does not result in a special advantage thereby, therefore, from economical view point using amount up to 4 mols is sufficient.

The reaction may be carried out at a temperature within the broad range of 50–130° C., preferably 70–100° C. Accordingly, temperature control is very easy and it is possible to carry out the reaction advantageously at a relatively low temperature range.

The reaction is carried out in an aliphatic carboxylic acid solvent. As such solvent, for instance, formic acid, acetic acid, and propionic acid may be cited. Especially, acetic acid is a solvent very suitable for practice of the process of the present invention.

A solvent may be an aliphatic carboxylic acid in liquid phase under the reaction conditions as its using amount, any amount is sufficient insofar as it can keep the reaction system in liquid phase under the reaction conditions. Normally, a solvent is used in an amount same to 20 times based on the weight of the total reaction substances, however, if desired a less or more amount is usable. However, if an amount is excessively smaller than said amount, an inconvenient side reaction is apt to take place, while on the contrary even if an amount larger than said amount is used, it does not necessarily result in special advantage. Therefore, from economical view point an extent of said 20 times is sufficient.

In the process of the present invention, it is necessary to make a cyano compound represented by the following Formula 1:

$$R\text{---}CN \qquad (1)$$

wherein R is selected from the group consisting of hydrogen atom, ammonium, alkali metal, alkaline earth metal, alkyl radical, phenyl radical, aralkyl radical and halogen, and at least one kind of said catalyst selected from said cyano compound and a cyan-type ion exchange resin co-exist in the reaction system at the time of the reaction.

The compound of said Formula 1 may be roughly divided into an inorganic cyano compound and an organic cyano compound.

As an inorganic cyano compound, for instance, hydrogen cyanide, potassium cyanide, sodium cyanide, ammonium cyanide, calcium cyanide and cyanogen chloride may be cited, of which hydrogen cyanide is an especially preferable compound.

As an organic cyano compound, for instance, acetonitrile, propionitrile, benzonitrile, adiponitrile and benzyl cyanide may be cited, of which acetonitrile is an especially preferable compound.

Of an organic cyano compound in these catalysts utilized in the present invention, as mentioned above, such nitriles as acetonitrile known as a solvent usable in preparation of a lactam held as practicable only when hydrogen chloride is used instead of sulfuric acid and hydrochloride of the material oxime is used, however, in the present invention, an aliphatic carboxylic acid is used as a catalyst and such nitriles are utilized as catalyst. The present invention is distinguished from the conventional processes as mentioned above in that both an aliphatic carboxylic acid solvent, for instance, acetic acid solvent and nitriles must co-exist. In case not in the form of hydrochloride, but an oxime per se held as uncapable of obtaining the object due to formation of resinous materials in the conventional process is used, the present invention is distinguished in this respect also. And as will be shown in Control (Control 4 to Example 4) later, reappearability of physical properties of polymers prepared under exactly the same conditions from a lactam obtained by using a solvent amount of nitrile only without using nitrile is unsatisfactory in contrast to the present invention wherein said reappearability is extremely good.

Another catalyst usable in the process of the present invention is a cyano-type anion exchange resin, for instance, resin sold under the trade name of Amberlite IRA 400 may be easily modified to a cyano-type and used.

It is recommendable to use a catalytic compound containing cyano group mentioned so far in an amount of 0.05–1.0 mol, preferably 0.3–1.0 mol based on 1 mol of cycloalkanone oxime (in case of its hydrochloride converted to oxime). In case an amount becomes smaller than said range, there is an inclination that improvement of the reaction rate is worsened and a side reaction is apt to take place, therefore, it is recommendable to use an amount larger than said lower limit. And if desired, it is possible to use a larger amount, however, normally with using an amount up to said upper limit a sufficiently satisfactory result is achieved.

In case an inorganic compound, especially prussic acid is used, it may be added in gaseous or liquid state to the reaction system. In case of using cyanides, they may be dissolved in a solvent or added per se to the reaction system. In case of an organic cyano compound, it may be used similarly.

The reaction pressure is not critical however, the reaction is normally carried out under atmospheric or a super-atmospheric pressure. The reaction is normally completed within a period of 30 minutes to 2 hours. After completion of Beckmann rearrangement, the solvent is distilled off under atmospheric or a reduced pressure and together with accompanied hydrogen chloride and catalyst, it is re-used in the next reaction. The residue consists of lactam hydrochloride and a by-product, therefore, lactam is selectively extracted by heating the residue in an inert organic solvent such as, for instance, toluene and xylene to a temperature of about 50° C. to the melting point of said lactam hydrochloride to decompose the residue, or after neutralizing the residue with an alkali, lactam is recovered by a known method. Cyanides are salts of an alkali metal, an alkaline earth metal or ammonium. It is possible to reactivate a cyan iron-type anion exchange resin after being used in the reaction and re-use it.

In accordance with the present invention, limitation and shortcomings of the conventional process wherein hydrogen chloride is used instead of sulfuric acid are overcome and it is possible to obtain a high-quality lactam or its hydrochloride industrially advantageously with excellent quality reappearability without losing an advantage of using hydrogen chloride.

Next, a few embodiments of the process of the present invention will be explained with reference to examples together with controls.

EXAMPLE 1

A glass autoclave equipped with a stirrer and a thermometer was charged with a solution dissolving 102 g. of hydrogen chloride in 600 g. of acetic acid, to which 113 g. (1 mol) of cyclohexanone oxime was added and when the mixture was stirred, it became a uniform solution. Next, 41 g. of acetonitrile was added at one time thereto and immediately said autoclave was heated from outside, then because temperature of the mixed solution rose by reaction, temperature control was effected so that a temperature of 80–85° C. was maintained. After continuing stirring for 15 hours, the contents of the autoclave were cooled to room temperature. The reaction mixture was distilled under a reduced pressure to recover acetic acid, hydrogen chloride and acetonitrile. The distillation residue consisting mainly of ε-caprolactam hydrochloride, it was made free ε-caprolactam by heating in xylene. The mixture was distilled to separate xylene, thereafter, 102.8 g. of ε-caprolactam was obtained as a fraction having a boiling point of 116–117° C./5 mm. Hg, which corresponded to a yield of 91% based on the oxime used.

On the other hand, using the same reaction apparatus, to a solution of 149.5 g. of cyclohexanone oxime hydrochloride (containing 113 g. of oxime) and 900 ml. of acetic acid, 41 g. of acetonitrile was added, the mixture was immediately heated to react under atmospheric pressure at 80° C. for 2 hours. The reaction mixture was treated same as above to obtain 101.5 g. of ε-caprolactam, which corresponded to a yield of 90%.

EXAMPLES 2–7 AND CONTROLS 1–16

A reaction system wherein an oxime, its hydrochloride, a solvent, a cyano group-containing catalyst and hydrogen chloride shown in Table 1 below were heated to temperatures described in said table under atmospheric pressure to react similar to Example 1 to obtain results shown in Table 1. In Table 1, for the purpose of comparison, Controls wherein a solvent amount of acetonitrile, benzonitrile and adiponitrile heretofore shown as usable as solvent were used and Controls wherein instead of an aliphatic carboxylic acid solvent, a nitro compound of hydrocarbon such as nitropropane and nitrobenzene, and halogenated hydrocarbon such as chlorobenzene, trichloroethylene and isopropyl chloride were used, were simultaneously shown.

For information, quality reappearability was shown by subjecting the product to distillation, after separating the solvent, hydrogen chloride and the catalyst, precisely neutralizing the residue with chloroform, continuously distilling off chloroform, 0.3% of caustic soda was added and the residue was distilled in vacuo, the obtained lactam was conjointly melted with a standard sample (pure ε-caprolactam prepared separately by repeating distillation and recrystallization) to check lowering of the melting point. With reference to 20 cases in which 20 reactions were carried out under exactly the same conditions, said lowering was checked, what did not lower or what in which a lowered value was the smallest was made a standard and frequency showing values different therefrom was shown by percent. Accordingly, what had a large numerical value showed quality variation was often and quality reappearability was poor.

TABLE 1

| No. | Material oxime or oxime hydrochloride [1] | HCl/material oxime or oxime hydrochloride (oxime-converted mol) | Solvent used | Amt. (ml.) | Cyano group-containing compound used | Amt. (ml.) | Reaction temperature (° C.) | Reaction time (hr.) | Produced lactam Name | Yield percent | Quality variation percent |
|---|---|---|---|---|---|---|---|---|---|---|---|
| Ex. 2 | Cyclopentanone | 2.7 | Acetic acid | 350 | Acetonitrile | 0.8 | 83 | 2.0 | Piperidone | 94 | 5 |
| Con. 1 | Cyclopentanone | 2.7 | do | 350 | | | 83 | 2.0 | do | [2] 20 | 33 |
| Con. 2 | Cyclopentanone | 2.7 | | | Acetonitrile | [3] 200 | 80 | 2.0 | do | [2] 78 | 20 |
| Con. 3 | Cyclopentanone hydrochloride | 2.7 | | | do | [3] 200 | 83 | 2.0 | do | 85 | 15 |
| Ex. 3 | Cyclopentanone hydrochloride | 2.7 | Acetic acid | 400 | do | 1.0 | 75 | 1.5 | do | 98 | 0 |
| Ex. 4 | Cyclohexanone | 2.7 | do | 500 | Propionitrile | 0.9 | 80 | 2.0 | Caprolactam | 91 | 0 |
| Con. 4 | Cyclohexanone | 3.0 | | | do | [3] 500 | 80 | 2.0 | do | [2] 74 | 20 |
| Con. 5 | Cyclohexanone | 3.0 | | | Adiponitrile | [3] 250 | 80 | 2.0 | do | [2] 68 | 25 |
| Con. 6 | Cyclohexanone | 3.0 | Nitropropane | 400 | Acetonitrile | 0.9 | 100 | 2.0 | do | [2] 70 | 20 |
| Con. 7 | Cyclohexanone | 2.0 | do | 400 | do | 0.9 | 100 | 2.0 | do | [2] 66 | 25 |
| Con. 8 | Cyclohexanone | 2.0 | Chlorobenzene | 400 | do | 0.9 | 100 | 2.0 | do | [2] 45 | 33 |
| Con. 9 | Cyclohexanone | 2.0 | Isopropyl chloride | 400 | do | 0.9 | 100 | 2.0 | do | [2] 70 | 20 |
| Con. 10 | Cyclohexanone | 2.0 | Trichloroethylene | 400 | do | 0.9 | 80 | 2.0 | do | [2] 73 | 10 |
| Ex. 5 | Cyclohexanone hydrochloride | 2.0 | Acetic acid | 500 | Hydrogen cyanide | 0.3 | 85 | 2.0 | do | 88 | 0 |
| Ex. 6 | Cyclohexanone hydrochloride | 2.0 | do | 500 | Potassium cyanide | 0.5 | 100 | 2.0 | do | 80 | 5 |
| Ex. 7 | Cyclohexanone hydrochloride | 4.0 | do | 800 | Acetonitrile | 1.0 | 100 | 1.5 | do | 92 | 0 |
| Con. 11 | Cyclohexanone hydrochloride | 4.0 | | | do | 300 | 100 | 1.5 | do | 78 | 15 |
| Con. 12 | Cyclohexanone hydrochloride | 4.0 | | | Propionitrile | [3] 300 | 100 | 1.5 | do | 70 | 20 |
| Con. 13 | Cyclohexanone hydrochloride | 4.0 | Nitrobenzene | 800 | Acetonitrile | 1.0 | 100 | 1.5 | do | 68 | 30 |
| Con. 14 | Cyclyhexanone hydrochloride | 4.0 | Chlorobenzene | 800 | do | 1.0 | 100 | 1.5 | do | 70 | 25 |
| Con. 15 | Cyclohexanone hydrochloride | 4.0 | Chloroform | 800 | do | 1.0 | 60 | 2.0 | do | 53 | 35 |
| Con. 16 | Cyclohexanone hydrochloride | 4.0 | Nitrobenzene | 800 | Hydrogen cyanide | 0.3 | 100 | 1.5 | do | 74 | 25 |

[1] Oxime converted-1 mol. [2] Production of resinous materials. [3] Milliliters.

EXAMPLES 8–23

Varying the material oxime or oxime hydrochloride, solvent and cyano group-containing compound, reactions were carried out under pressure as in Example 1. Results were as shown in Table 2 below.

TABLE 2

| No. | Material oxime or oxime hydrochloride [1] | HCl/material oxime or oxime hydrochloride (oxime-converted mol) | Solvent used | Amt. (ml.) | Cyano group-containing compound used | Amt. (ml.) | Reaction temperature (°C.) | Reaction time (hr.) | Produced lactam Name | Yield percent | Quality variation percent |
|---|---|---|---|---|---|---|---|---|---|---|---|
| Ex. 8 | Cyclopentanone | 2.0 | Formic acid | 100 | Acetonitrile | 0.9 | 100 | 2.0 | Piperidone | 93 | 0 |
| Ex. 9 | do | 2.8 | Propionic acid | 200 | Prussic acid | 0.6 | 70 | 1.5 | do | 90 | 0 |
| Ex. 10 | Cyclopentanone hydrochloride | 3.0 | do | 200 | Acetonitrile | 0.8 | 80 | 2.0 | do | 95 | 0 |
| Ex. 11 | do | 3.0 | do | 400 | Benzonitrile | 1.0 | 110 | 1.5 | do | 92 | 0 |
| Ex. 12 | Cyclooctanone | 1.5 | Formic acid | 300 | Prussic acid | 0.3 | 80 | 2.0 | Capryllactam | 88 | 5 |
| Ex. 13 | do | 4.0 | do | 500 | Acetonitrile | 1.0 | 90 | 1.5 | do | 91 | 0 |
| Ex. 14 | do | 2.2 | Acetic acid | 400 | Prussic acid | 0.5 | 90 | 1.5 | do | 90 | 0 |
| Ex. 15 | do | 3.0 | do | 800 | Cyano-type ion exchange resin | [2] 30 | 100 | 2.0 | do | 85 | 5 |
| Ex. 16 | Cyclooctanone hydrochloride | 2.5 | Dichloroacetic acid | 500 | Adiponitrile | 1.0 | 80 | 2.0 | do | 93 | 0 |
| Ex. 17 | do | 3.0 | Propionic acid | 800 | Ammonium cyanide | 1.0 | 80 | 2.0 | do | 83 | 5 |
| Ex. 18 | do | 3.0 | do | 500 | Benzyl cyanide | 0.9 | 90 | 1.5 | do | 92 | 0 |
| Ex. 19 | Cyclododecanone | 2.0 | Formic acid | 500 | Acetonitrile | 0.8 | 70 | 2.0 | Laurinlactam | 95 | 0 |
| Ex. 20 | do | 2.5 | Acetic acid | 500 | do | 1.0 | 80 | 2.0 | do | 96 | 5 |
| Ex. 21 | do | 2.0 | do | 800 | Sodium cyanide | 1.0 | 100 | 1.5 | do | 87 | 0 |
| Ex. 22 | Cyclododecanone hydrochloride | 3.8 | do | 300 | Propionitrile | 0.9 | 80 | 2.0 | do | 94 | 0 |
| Ex. 23 | do | 4.0 | Propionic acid | 600 | do | 1.0 | 100 | 2.0 | do | 97 | 0 |

[1] Oxime-converted mol=1.0.
[2] Grams.

EXAMPLE 24

In Example 1 (reaction under pressure), to the reaction mixture solution having completed the reaction, acetic acid solution of hydrogen chloride, cyclohexanone oxime and acetonitrile were continuously added to ratios of 468 g., 75.4 g. and 27.3 g. per hour, on the other hand, the reaction mixture was continuously taken out at a ratio of 570 g. per hour. The reaction temperature was adjusted to 80–85° C. By the reaction of 10 hours, ε-caprolactam corresponding to a yield of 92% was obtained.

What is claimed is:

1. In a process for the preparation of a lactam hydrochloride comprising reacting a cycloalkanone oxime or its hydrochloride with hydrogen chloride in a solvent to obtain the corresponding lactam hydrochloride, the improvement which comprises carrying out the reaction in an aliphatic carboxylic acid solvent at a temperature of 50–130° C., in the co-presence of a catalyst selected from the group consisting of a cyano compound represented by the following Formula 1:

$$R—CN \quad (1)$$

wherein R is selected from the group consisting of hydrogen atom, ammonium, alkali metal, alkaline earth metal, alkyl radical, phenyl radical, aralkyl radical and halogen, and a cyano-type ion exchange resin.

2. The process of claim 1 wherein said catalyst co-exists in an amount of 0.05–1.0 mol per 1 mol of said cycloalkanone oxime.

3. The process of claim 1 wherein said hydrogen chloride is reacted in an amount of 1.5–4 mols per mol of said cycloalkanone oxime.

4. The process of claim 1 wherein said cycloalkanone oxime is an oxime having 4–12 carbon atoms.

5. The process of claim 1 wherein said catalyst is an inorganic cyano compound selected from the group consisting of hydrogen cyanide, potassium cyanide, sodium cyanide, ammonium cyanide, calcium cyanide and cyanogen chloride.

6. The process of claim 1 wherein said catalyst is an organic cyano compound selected from the group consisting of acetonitrile, propionitrile, benzonitrile, adiponitrile and benzyl cyanide.

7. A process for preparing a free lactam which comprises heating to decompose in an inert organic solvent lactam hydrochloride obtained by reacting cycloalkanone oxime or its hydrochloride with hydrogen chloride in an aliphatic carboxylic acid solvent at a temperature of 50–130° C. in the co-presence of a catalyst selected from the group consisting of a cyano compound represented by the following Formula 1:

$$R—CN \quad (1)$$

wherein R is selected from the group consisting of hydrogen atom ammonium radical alkali metal, alkaline earth metal, alkyl radical, phenyl radical, aralkyl radical and halogen, and a cyano-type ion exchange resin.

8. The process of claim 7 wherein said thermal decomposition is carried out at a temperature within the range of 50° C. to the melting point of said lactam hydrochloride.

References Cited

UNITED STATES PATENTS

| 2,297,520 | 9/1942 | Wiest et al. | 260—239.3 |
| 2,423,200 | 7/1947 | Moncrieff et al. | 260—239.3 |
| 2,721,199 | 10/1955 | Huber | 260—239.3 |
| 3,389,134 | 6/1968 | Garritsen et al. | 260—239.3 |
| 3,404,148 | 10/1968 | Garritsen | 260—239.3 |
| 3,437,655 | 4/1969 | Garritsen et al. | 260—239.3 |

JOHN D. RANDOLPH, Primary Examiner

R. T. BOND, Assistant Examiner

U.S. Cl. X.R.

260—294.7